United States Patent [19]
Owens

[11] Patent Number: 5,133,567
[45] Date of Patent: Jul. 28, 1992

[54] COMBINATION INFANT CARRIER, CAR SEAT AND STROLLER

[76] Inventor: Valerie Owens, 1737 Mountain Ave., Scotch Plains, N.Y. 07076

[21] Appl. No.: 687,682

[22] Filed: Apr. 19, 1991

[51] Int. Cl.5 .............................................. B62B 7/12
[52] U.S. Cl. ...................................... 280/30; 16/126; 280/643; 280/650; 280/47.371
[58] Field of Search ............ 280/30, 648, 655, 47.371, 280/642, 643, 647, 650; 16/111 R, 112, 125, 126; 297/250

[56] References Cited

U.S. PATENT DOCUMENTS

| | | | |
|---|---|---|---|
| 2,179,275 | 11/1939 | Sacheroff | 280/648 |
| 2,720,911 | 10/1955 | Lantz | 280/30 |
| 2,722,966 | 11/1955 | Belyeu | 280/30 |
| 2,803,468 | 8/1957 | Thompson | 280/30 |
| 2,805,076 | 9/1957 | Thomas | 280/643 |
| 4,634,177 | 1/1987 | Meeker | 297/250 |
| 4,664,396 | 5/1987 | Pietrafesa | 280/30 |
| 4,679,804 | 7/1987 | Johnson | 280/30 |
| 4,834,403 | 5/1989 | Yanus et al. | 280/30 |
| 4,874,182 | 10/1989 | Clark | 280/30 |
| 4,989,888 | 2/1991 | Qureshi et al. | 280/30 |
| 5,022,669 | 6/1991 | Johnson | 280/30 |

*Primary Examiner*—Andres Kashnikow
*Assistant Examiner*—Michael Mar
*Attorney, Agent, or Firm*—Abdallah & Muckelroy

[57] ABSTRACT

A convertible apparatus that can be used as an infant carrier, a car seat and a stroller. The apparatus includes a carrier body selectively attachable to a carrier body base attachable to car seat belts, a stroller handle assembly attached to the carrier body, and a stroller wheel assembly attached to the carrier body base.

7 Claims, 2 Drawing Sheets

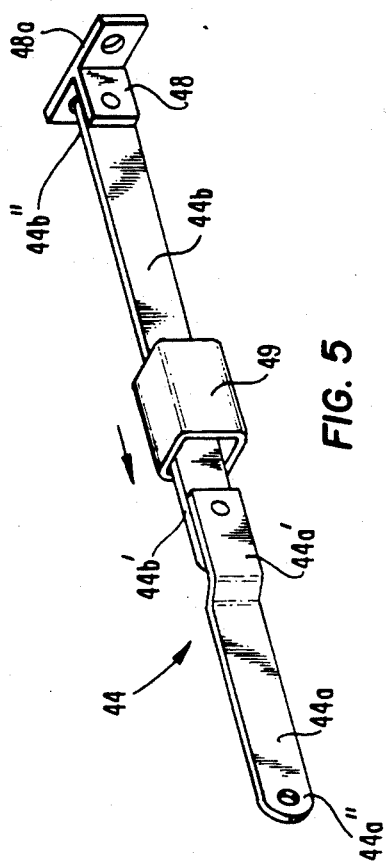
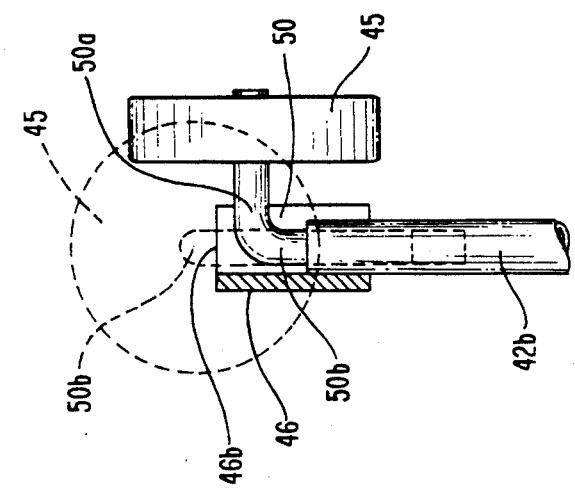
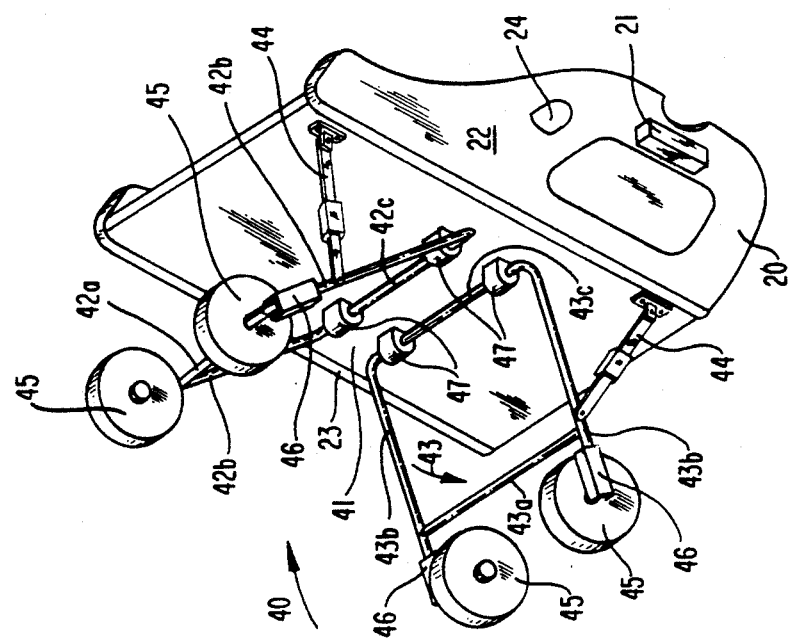

COMBINATION INFANT CARRIER, CAR SEAT AND STROLLER

BACKGROUND OF THE INVENTION

The present invention generally relates to infant carriers, and more particularly to infant carriers that can be converted for multiple use.

Various convertible infant carriers are disclosed in the prior art. In U.S. Pat. No. 2,720,911 to Lantz a convertible baby stroller and child's seat for automobiles is disclosed which generally comprises a box-shaped body having a foldable back element and a wheel assembly selectively receivable within the box-shaped body. U.S. Pat. No. 2,722,966 to Belyeu also discloses a child car seat that can be converted to a carriage which substantially comprises a flaccid seat suspended between a foldable, wheeled frame assembly. In U.S. Pat. No. 2,803,468 to Thompson an infant's auto seat-stroller is disclosed having means to attach the device to the back support portion of an automobile seat. U.S. Pat. No. 2,805,076 to Thomas discloses a combination stroller, car seat, bed and highchair. These exemplary convertible infant carriers are generally difficult to move in and out of an automobile. To overcome the difficulties in transporting an infant carrier to and from an automobile, infant carriers having a selectively separable seat portion and base portion have been developed in the prior art, for example, as shown in U.S. Pat. No. 4,634,177 to Meeker. To the Applicant's knowledge no two-component infant carrier which can be converted for use as a stroller is disclosed in the prior art.

SUMMARY OF THE INVENTION

The present invention is an apparatus that can be selectively used as an infant carrier, a car seat and a stroller. The apparatus comprises a carrier body selectively attachable to a carrier body base, a carrier body base selectively attachable to car seat belts, a stroller handle assembly attached to a rear portion of the carrier body, and a stroller wheel assembly attached to a bottom portion of the carrier body base. The stroller handle assembly includes a stroller handle pivotally attached to the carrier body. The stroller handle can be locked in an upright position by means of stroller handle locking means for use of the apparatus as a stroller and locked in a folded position for use of the apparatus as an infant carrier or car seat. The stroller wheel assembly comprises a plurality of wheel frames pivotally attached to a wheel assembly base that is attached to the bottom portion of the carrier body base. Wheels are rotatably attached to the wheel frames and are selectively lockable in an upright position for use of the apparatus as a stroller. The stroller wheel assembly can be selectively disposed adjacent to the wheel assembly base for use of the apparatus as a car seat.

BRIEF DESCRIPTION OF THE DRAWINGS

FIG. 4 is a perspective view of the bottom portion of the carrier body base showing the stroller wheel assembly.

FIG. 5 is an enlarged perspective view of the wheel frame locking means.

FIG. 6 is a plan view of a portion of the stroller wheel assembly illustrating the wheel locking means.

DESCRIPTION OF A PREFERRED EMBODIMENT

Figure 1:
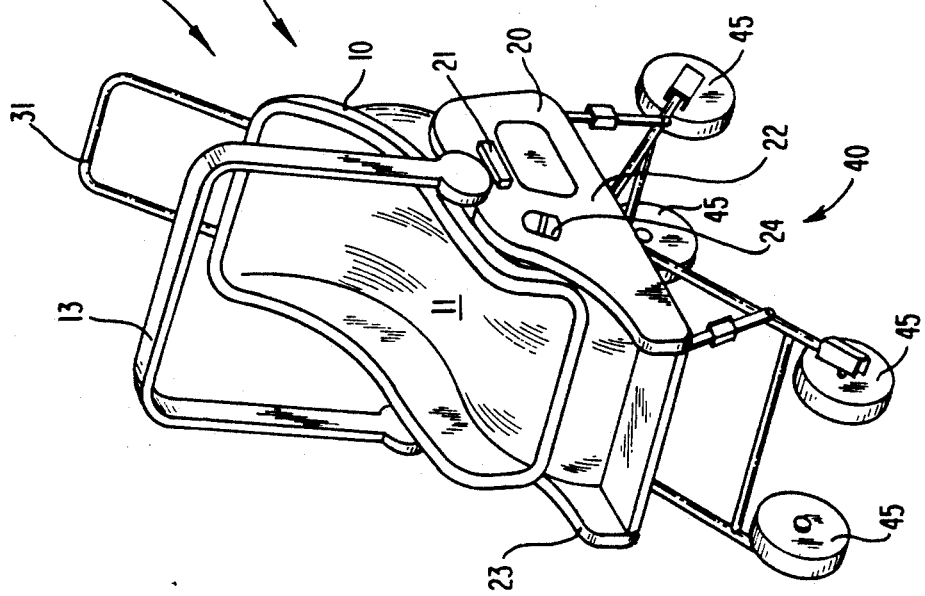
FIG. 1 is a perspective view of the apparatus of the present invention shown disposed for use as a stroller.

FIG. 1 illustrates in a perspective view the convertible apparatus 1 of the present invention. Apparatus 1 includes an infant carrier body 10, a carrier body base 20, a stroller handle assembly 30 and a stroller wheel assembly 40. Carrier body 10 is provided for seating or laying of an infant therein and is selectively attachable to the carrier body base 20. A preferred means of selectively attaching the carrier body 10 to carrier body 20 is disclosed in U.S. Pat. No. 4,634,177 to Meeker. However, the attachment means disclosed in the Meeker patent is illustrative of suitable means and is not intended as a limitation on the present invention.

Carrier body 10 is a unitary, preferably molded structure, formed having a seat portion 11, a back support portion 12, and a carrier body handle 13. Back support portion 12 is preferably inclined for comfortable support of an infant in either an lying or sitting position. Carrier body handle 13 is provided to facilitate transport of the apparatus 1 when the carrier body 10 is utilized as an infant carrier separated from the carrier body base 20.

Carrier body base 20 is also preferably a molded structure which receives the carrier body 10 in selective engagement at the top portion 21 of the respective side walls 22, 23 of the carrier body base 20. Carrier body base 20 also includes a seat belt tray 24 for receipt of car seat belts (not shown) as generally known in the art when the apparatus 1 is utilized as a car seat.

Figure 2:
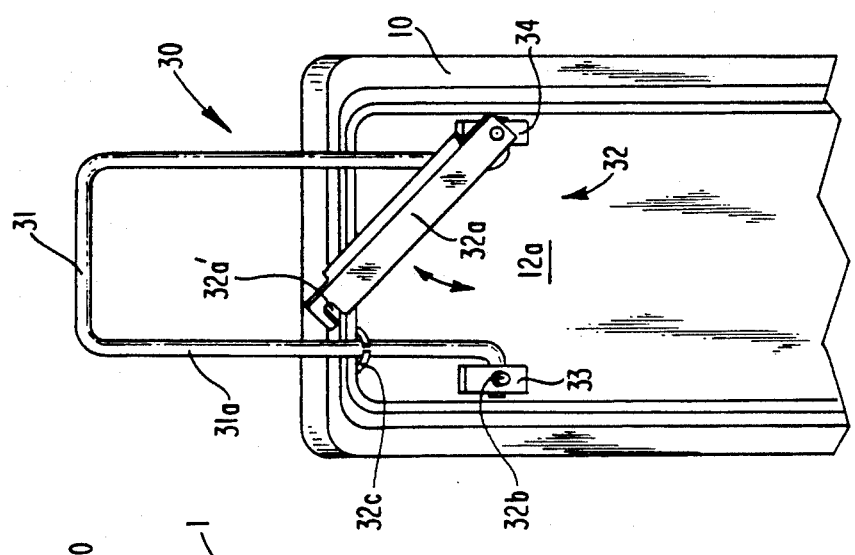
FIG. 2 is a fragmented rear plan view of the apparatus showing the stroller handle disposed in an upright position.

Reference is now made to FIG. 2 which illustrates in a fragmented rear plan view of the carrier body 10 the stroller handle assembly 30 of the present invention. Stroller handle assembly 30 includes a stroller handle 31 formed as a substantially U-shaped frame member and stroller handle locking means 32. Stroller handle 31 is pivotally attached at respective ends thereof to first and second stroller handle support blocks 33, 34 which are fixedly attached in spaced relationship to the rear face 12a of the back support portion 12 of the carrier body 10. Stroller handle locking means 32 includes a stroller handle locking bar 32a which is rotatably attached at one end thereof to said second stroller handle support block 34. An edge notch 32a' is formed proximate to the opposite end of said stroller handle locking bar 32a which selective engages a locking pin 32b fixedly attached to said first stroller handle support block 33. Thereby when said edge notch 32a' is engaged with said locking pin 32b the stroller handle 31 can be retained in a selected position by bearing engagement of said stroller handle 31 against said stroller handle locking bar 32a. Stroller handle locking means 32 further includes a stroller handle clamp 32c disposed in vertical alignment with a vertically-extending portion 31a of said stroller handle 31 above said first stroller handle support block 33. Stroller handle clamp 32c engages the stroller handle 31 when the same is disposed in an upright position.

Figure 3:
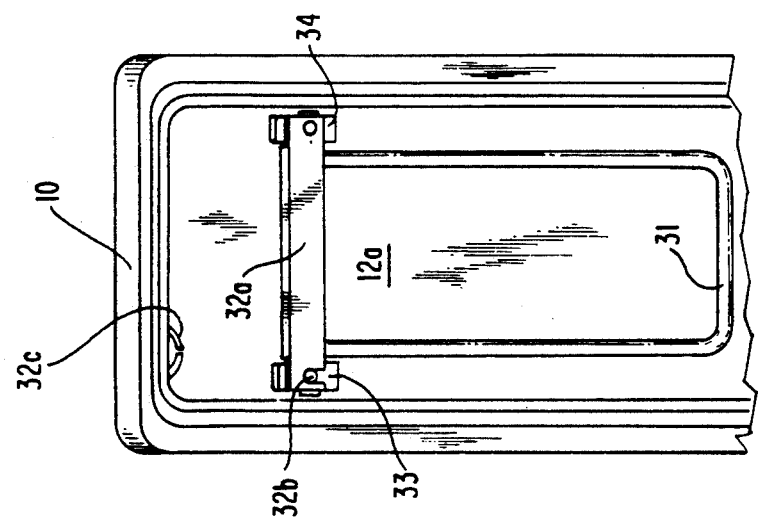
FIG. 3 is a fragmented rear plan view of the apparatus showing the stroller handle disposed in a folded position.

FIG. 3 illustrates in a fragmented rear plan view of the carrier body 10 the folded position of the stroller handle 31.

FIG. 4 illustrates in a perspective view of the bottom of the carrier body base 20 the stroller wheel assembly 40 of the present invention. Stroller wheel assembly 40 includes a wheel assembly base plate 41, a pair of wheel frames 42, 43, wheel frame locking means 44, a plurality of wheels 45 and wheel locking means 46. Wheel assembly base plate is fixedly attached between the respective side walls 22, 23 of the carrier body base 20. Wheel frames 42, 43 respectively comprise substantially U-shaped frame members having transverse support bars 42a, 43a disposed between the frame vertical legs 42b, 43b of said U-shaped frame members. Wheel frames 42, 43 are pivotally attached at the frame horizontal legs 42c, 43c thereof to the wheel assembly base plate 41 by means of wheel frame clamps 47.

Wheel frame locking means 44 provide means for locking the wheel frames 42, 43 in an upright position for use of the apparatus 1 as a stroller. FIG. 5 illustrates in an enlarged perspective view the wheel frame locking means 44 of the present invention. Wheel frame locking means 44 comprises a first flat bar member 44a and a second flat bar member 44b pivotally attached to each other at respective first ends thereof 44a', 44b'. The first bar member 44a pivotally attaches at the second end thereof 44a'' to a frame vertical leg 42b, 43b of the respective wheel frames 42, 43 (FIG. 4). The second bar member 44b pivotally attaches at the second end thereof 44b'' to a base plate clip 48 which is fixedly attachable at the clip base 48a thereof to said wheel assembly base plate 41 (FIG. 4). A bar member clamp 49 is slidably attached about said second bar member 44b and can be moved longitudinally thereon to secure the respective bar members 44a, 44b in aligned displacement.

FIG. 6 illustrates in a plan view the attachment of a wheel 45 to a wheel frame 42. Wheel 45 is rotatably attached to the horizontal leg 50a of an L-shaped wheel axis 50. The vertical leg 50b of the L-shaped wheel axis 50 slidably and rotatably engages the end of a frame vertical leg 42b. Wheel locking means 46 is fixedly attached at the end of said frame vertical leg 42b and substantially comprises a wheel axis brace member having a substantially C-shaped transverse cross-section as viewed from the top of said wheel locking means 46. When wheel 45 is disposed in an upright position as illustrated by the solid lines in FIG. 6 the wheel 45 is locked in this position by bearing engagement of the horizontal leg 50a of the wheel axis 50 against the wheel locking means 46. Wheel 45 can be disposed in a folded position as illustrated by the phantom lines in FIG. 6 by raising the horizontal leg 50a of wheel axis 50 above the top edge 46a of said wheel locking means 46 and rotating the wheel axis 50 to bring the horizontal leg 50 of said wheel axis 50 in bearing engagement with the top edge 46a of said wheel locking means 46.

The various uses of the convertible apparatus 1 of the present invention can be better understood from the following. To utilize the carrier body 10 of the apparatus 1 as an infant carrier the stroller handle 31 is disposed in its folded position and retained in that position by stroller handle locking bar 32a as illustrated in FIG. 3. The carrier body 10 can then be transported by means of said carrier body handle 13. To utilize the apparatus 1 as a stroller, the stroller handle 31 is disposed in its upright position and stroller wheel assembly 40 is disposed in an unfolded position having the wheels 45 thereof disposed in an upright position as illustrated in FIG. 1. To utilize the apparatus 1 as a car seat the stroller handle 31 is disposed in its folded position (FIG. 3) and the stroller wheel assembly 40 is disposed in its folded position by rotating wheel axis 50 to a position having the horizontal leg 50a bearing against the top edge 46a of wheel locking means 46 and disengaging the bar member clamp 49 from the pivotally attached ends 44a', 44b' of the first and second bar members 44a, 44b to permit the bar members 44a, 44b to be pivoted relative to each other to bring the stroller wheel assembly 40 to a substantially flat position adjacent to the wheel assembly base plate 41.

Various changes and modifications may be made to the present invention without departing from the spirit and scope of the present disclosure. Such changes and modifications are intended as part of the present disclosure as held by a fair reading of the following claims.

Therefore, in view of the foregoing, I claim:

1. An apparatus for selective use as an infant carrier, car seat and stroller comprising a carrier body selectively attachable to a carrier body base;

the carrier body base selectively attachable to car seat belts;

a stroller handle assembly attached to a rear portion of said carrier body comprising a pivotally attached stroller handle and stroller handle locking means, said stroller handle comprising a substantially U-shaped frame member, said frame member being pivotally attached at respective ends thereof to first and second stroller handle support blocks, said stroller handle support blocks being fixedly attached to a rear portion of said carrier body, said stroller handle locking means comprising a stroller handle locking bar rotatably attached at one end thereof to said first stroller handle support block and selectively engageable at the opposite end thereof to a locking pin disposed in said second stroller handle support block, and a stroller handle clamp fixedly attached to a rear portion of said carrier body in spaced relationship from said first and second stroller handle support blocks; and a stroller wheel assembly attached to a bottom portion of said carrier body base comprising a wheel assembly base plate, a plurality of wheel frames pivotally attached to said wheel assembly base plate, each of said wheel frames being selectively lockable in an upright position by wheel frame locking means, and a plurality of wheels slidably and rotatably attached to said wheel frames, said wheels being selectively lockable in said upright position by wheel locking means.

2. An apparatus as in claim 1 wherein said wheel frame locking means comprises a first flat bar member and a second flat bar member pivotally attached to each other at respective first ends thereof, said first flat bar member being pivotally attached at the second end thereof to a wheel frame and said second flat bar member being pivotally attached at the second end thereof to said wheel assembly base, and a bar member clamp slidably attached to said first flat bar member and said second flat bar member in a manner to be selectively disposed about the juncture of said first flat bar member and said second flat bar member to prevent relative pivoting thereof.

3. An apparatus as in claim 2 wherein each said wheel is attached to said wheel frame by means of an L-shaped wheel axis wherein the vertical leg thereof slidably and rotatably engages said wheel frame, said wheel axis being lockable in a manner to dispose said wheel in an upright position by wheel locking means comprising a wheel axis brace member having a substantially C-shaped transverse cross-section and being fixedly attached to said wheel frame, said wheel axis brace member engaging the horizontal leg of said wheel axis to lock said wheel in an upright position.

4. An apparatus for selective use as an infant carrier, car seat and stroller comprising a carrier body selectively attachable to a carrier body base;

a carrier body base selectively attachable to car seat belts;

a stroller handle assembly attached to a rear portion of said carrier body comprising a stroller handle and stroller handle locking means, said stroller handle comprising a substantially U-shaped frame member, said frame member being pivotally attached at respective ends thereof to first and second stroller handle support blocks, said stroller handle support blocks being fixedly attached to a rear portion of said carrier body, said stroller handle locking means comprising a stroller handle locking bar rotatably attached at one end thereof to said first stroller handle support block and selectively engageable at the opposite end thereof to a locking pin disposed in said second stroller handle support block, and a stroller handle clamp fixedly attached to a rear portion of said carrier body in spaced relationship from said first and second stroller handle support blocks; and a stroller wheel assembly attached to a bottom portion of said carrier body base comprising a wheel assembly base plate, a plurality of wheel frames pivotally attached to said wheel assembly base plate, each of said wheel frames being selectively lockable in an upright position by wheel frame locking means, and a plurality of wheels slidably and rotatably attached to said wheel frames, said wheels being selectively lockable in an upright position by wheel locking means, said wheel frame locking means comprising a first flat bar member and a second flat bar member pivotally attached to each other at respective first ends thereof, said first flat bar member being pivotally attached at the second end thereof to a wheel frame and said second flat bar member being pivotally attached at the second end thereof to said wheel assembly base, and a bar member clamp slidably attached to said first flat bar member and said second flat bar member in a manner to be selectively disposed about the juncture of said first flat bar member and said second flat bar member to prevent relative pivoting thereof, each said wheel being attached to said wheel frame by means of an L-shaped wheel axis wherein the vertical leg thereof slidably and rotatably engages said wheel frame, said wheel axis being lockable in a manner to dispose said wheel in an upright position by wheel locking means comprising a wheel axis brace member having a substantially C-shaped transverse cross-section and being fixedly attached to said wheel frame, said wheel axis brace member engaging the horizontal leg of said wheel axis to lock said wheel in an upright position.

5. An improvement in a combination infant carrier and car seat of the type in which a carrier body is selectively attachable to a carrier body base, the improvement comprising means to selectively convert said infant carrier and car seat to a stroller, said means comprising a foldable stroller handle assembly attached to a rear portion of said carrier body and a foldable stroller wheel assembly attached to a bottom portion of said carrier body base, said stroller handle assembly comprising a stroller handle and stroller handle locking means, said stroller handle comprising a substantially U-shaped frame member, said frame member being pivotally attached at respective ends thereof to first and second stroller handle support blocks, said stroller handle support blocks being fixedly attached to a rear portion of said carrier body, said stroller handle locking means comprising a stroller handle locking bar rotatably attached at one end thereof to said first stroller handle support block and selectively engageable at the opposite end thereof to a locking pin disposed in said second stroller handle support block, and a stroller handle clamp fixedly attached to a rear portion of said carrier body in spaced relationship from said first and second stroller handle support blocks.

6. An improvement as in claim 5 wherein said stroller wheel assembly comprises a wheel assembly base plate, a plurality of wheel frames pivotally attached to said wheel assembly base plate, each of said wheel frames being selectively lockable in an upright position by wheel frame locking means, and a plurality of wheels slidably and rotatably attached to said wheel frames, said wheels being selectively lockable in an upright position by wheel locking means, said wheel frame locking means comprising a first flat bar member and a second flat bar member pivotally attached to each other at respective first ends thereof, said first flat bar member being pivotally attached at the second end thereof to a wheel frame and said second flat bar member being pivotally attached at the second end thereof to said wheel assembly base, and a bar member clamp slidably attached to said first flat bar member and said second flat bar member in a manner to be selectively disposed about the juncture of said first flat bar member and said second flat bar member to prevent relative pivoting thereof, each said wheels being attached to a wheel frame by means of an L-shaped wheel axis wherein the vertical leg thereof slidably and rotatably engages said wheel frame, said wheel axis being lockable in a manner to dispose said wheel in an upright position by wheel locking means comprising a wheel axis brace member having a substantially C-shaped transverse cross-section and being fixedly attached to said wheel frame, said wheel axis brace member engaging the horizontal leg of said wheel axis to lock said wheel in an upright position.

7. An improvement in a combination infant carrier and car set of the type in which a carrier body is selectively attachable to a carrier body base, the improvement comprising means to selectively convert said infant carrier and car seat to a stroller, said means comprising a foldable stroller handle assembly attached to a rear portion of said carrier body and a foldable stroller wheel assembly attached to a bottom portion of said carrier body base, said stroller handle assembly comprising a stroller handle and stroller handle locking means, said stroller handle comprising a substantially U-shaped frame member, said frame member being pivotally attached at respective ends thereof to first and second stroller handle support blocks, said stroller handle support blocks being fixedly attached to a rear portion of said carrier body, said stroller handle locking means comprising a stroller handle locking bar rotatably attached at one end thereof to said first stroller handle support block and selectively engageable at the opposite end thereof to a locking pin disposed in said second stroller handle support block, and a stroller handle clamp fixedly attached to a rear portion of said carrier body in spaced relationship from said first and second stroller handle support blocks, said stroller wheel assembly comprising a wheel assembly base plate, a plurality of wheel frames pivotally attached to said wheel assembly base plate, each of said wheel frames being selectively lockable in an upright position by wheel frame locking means, and a plurality of wheels slidably and rotatably attached to said wheel frames, said wheels being selectively lockable in an upright position by wheel locking means, said wheel frame locking means comprising a first flat bar member and a second flat bar member pivotally attached to each other at respective first ends thereof, said first flat bar member being pivotally attached at the second end thereof to a wheel frame and said second flat bar member being pivotally attached at the second end thereof to said wheel assembly base, and a bar member clamp slidably attached to said first flat bar member and said second flat bar member in a manner to be selectively disposed about the juncture of said first flat bar member and said second flat bar member to prevent relative pivoting thereof, each said wheels being attached to a wheel frame by means of an L-shaped wheel axis wherein the vertical leg thereof slidably and rotatably engages said wheel frame, said wheel axis being lockable in a manner to dispose said wheel in an upright position by wheel locking means comprising a wheel axis brace member having a substantially C-shaped transverse cross-section and being fixedly attached to said wheel frame, said wheel axis brace member engaging the horizontal leg of said wheel axis to lock said wheel in an upright position.

* * * * *